United States Patent Office 2,772,288
Patented Nov. 27, 1956

2,772,288

BASIC ESTERS OF N-ARYL AND N-CYCLOALKYL INDANCARBAMIC ACIDS, THEIR SALTS AND METHODS FOR THEIR PREPARATION

John W. Cusic, Skokie, Ill., assignor, by mesne assignments, to G. D. Searle & Co., Skokie, Ill., a corporation of Delaware No Drawing. Application March 16, 1953,
Serial No. 342,732

11 Claims. (Cl. 260—326.3)

This invention relates to disubstituted carbamates, to salts thereof and to methods for their preparation. More particularly, this invention relates to basic esters of carbamic acid wherein the carbamyl nitrogen is attached to a monocarbocyclic radical as well as to a methylene radical which is a part of an indan nucleus. These compounds can be represented as the 1-indancarbamates and 2-indancarbamates of the following general structural formula

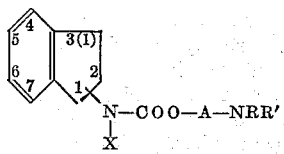

wherein X is a homomonocyclic radical, A is a lower alkylene radical and NRR' is a non-aromatic amino radical.

In the foregoing structural formula the nitrogen atom of the carbamyl radical is attached to one of the methylene radicals of the indan (hydrindene) nucleus. The radical X is a homomonocyclic radical, i. e., a radical having a single all-carbon nucleus which can be of the phenyl or cycloalkyl type. Examples for the former type are phenyl and lower alkylated phenyl radicals such as tolyl, xylyl and cumenyl. Examples for the cycloalkyl radicals which X can represent are cyclopropyl, cyclobutyl, cyclopentyl and cyclohexyl as well as lower alkylated derivatives thereof such as methylcyclopentyl, ethylcyclohexyl and the like. The radical A is a lower alkylene radical such as ethylene, propylene, butylene, trimethylene, tetramethylene, pentamethylene and hexamethylene. The amino group NRR' represents secondary and tertiary amino radicals which are non-aromatic in character. It includes monoalkylamino radicals such as methylamino, ethylamino, propylamino, isopropylamino, butylamino, isobutylamino, secondary-butylamino, isoamylamino, hexylamino, isohexylamino, and related radicals. The radical NRR' can also represent non-aromatic heterocyclyl radicals as morpholino, piperazino and N'-alkylpiperazino radicals. Of special importance are radicals wherein R and R' are combined to form a lower alkylene chain containing four to five carbon atoms in the heterocyclic nucleus formed thereby as in the case of the pyrrolidino, 2,5-dimethylpyrrolidino, piperidino and lupetidino radicals.

The organic bases of the foregoing type form salts which are non-toxic in therapeutic dosage with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, and related acids. They also form quaternary ammonium salts with a variety of organic esters of sulfuric, hydrohalic, and aromatic sulfonic acids. Among such esters are methyl chloride, ethyl chloride, propyl bromide, butyl chloride, isobutyl bromide, ethyl chloroacetate, β-bromoethyl acetate, methyl β-bromo-propionate, ethylene bromohydrin, ethylene chlorohydrin, propylene bromohydrin, benzyl chloride, benzyl bromide, phenethyl bromide, naphthylmethyl chloride, dimethyl sulfate, diethyl sulfate, methyl benzenesulfonate, ethyl toluenesulfonate, propyl toluenesulfonate, propylene chlorohydrin, γ-hydroxypropyl bromide, allyl chloride, methallyl chloride, crotyl bromide, and the like.

The compounds of this invention can be prepared by reacting two or more equivalents of an amine of the formula

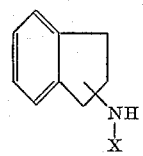

with one equivalent of a haloalkyl halocarbonate (also known as haloformate) of the formula Hal—COO—A—Hal wherein Hal is a halogen atom of atomic number greater than 9 and includes chlorine, bromine, and iodine, and wherein A is a lower alkylene radical. This reaction is preferably carried out at low temperature (0–25° centigrade) in an inert solvent. The reaction can also be conducted in aqueous medium in the presence of caustic alkali, avoiding an excess of the amine. The resulting haloalkyl disubstituted carbamate has the formula

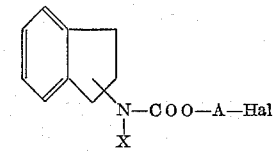

This halogenated ester is then reacted with two or more equivalents of a monoalkyl, dialkyl or saturated heterocyclic amine, generally at temperatures in the range of 50–150° C. The basic ester so formed is removed by conventional procedures and may be purified by distillation or by conversion to a crystalline salt.

The compounds of this invention may also be prepared by reacting a secondary amine of the formula

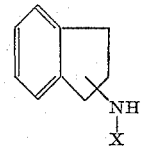

with phosgene in an inert solvent to form a disubstituted carbamyl chloride of the formula

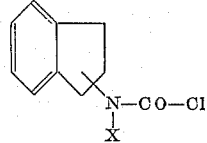

The latter is reacted with an amino alcohol of the formula

HO—A—NRR' generally in an inert solvent at temperatures in the range of 25–150° C.

The compounds of this invention are valuable medicinal agents. They are ganglion blocking agents but do not affect directly the spasmogenic action of acetylcholine on the smooth muscle. They are valuable cardiovascular agents causing a pronounced depressor effect and peripheral vasodilation. Compounds of the foregoing structural formula wherein X is a lower cycloalkyl radical are diuretics.

The following examples illustrate in more detail the present invention without, however, limiting it thereto. The relative quantities of materials are given in parts by weight, temperatures in degrees centigrade (° C.) and pressures in millimeters (mm.) of mercury.

*Example 1*

A solution of 139 parts of 1-anilinoindan in 880 parts of dry benzene is added with good agitation to a chilled solution of 50 parts of β-chloroethyl chloro-carbonate in 700 parts of dry ether. The reaction mixture is agitated for 2 hours after the addition at 0° C. and for 24 hours at room temperature. It is then filtered and the filtrate is evaporated leaving a thick oily residue of β-chloroethyl N-phenyl-1-indancarbamate.

A solution of 54 parts of β-chloroethyl N-phenyl-1-indancarbamate, 40 parts of diethylamine and 2 parts of potassium iodide in 80 parts of methyl ethyl ketone is heated in a closed vessel at 80° C. for 5 days. The reaction mixture is treated with cold dilute hydrochloric acid and with ether, and the aqueous layer is separated, made alkaline and extracted with ether. The ether extract is dried and evaporated leaving a residue of β-diethylaminoethyl N-phenyl-1-indancarbamate which is distilled at about 200–205° C. and 1 mm. pressure.

Treatment of an ether solution of this base with one equivalent of absolute alcoholic hydrogen chloride yields a crystalline hydrochloride which melts at about 152–153° C. after recrystallization from methyl ethyl ketone.

*Example 2*

A solution of 10 parts of β-diethylaminoethyl N-phenyl-1-indancarbamate in 40 parts of methyl ethyl ketone is heated with methyl bromide gas until 10 parts are absorbed. A precipitate of the crystalline methobromide soon forms. This is separated and dried. It melts at 175–176° C. after recrystallization from isopropanol. The compound has the structural formula

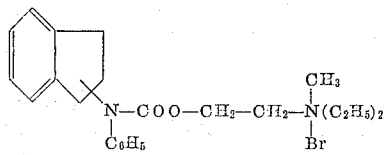

*Example 3*

A mixture of 10 parts of β-diethylaminoethyl N-phenyl-1-indancarbamate and 21.3 parts of ethyl iodide in 40 parts of methyl ethyl ketone is heated in a shielded pressure reactor at 80° C. After cooling the precipitate is collected on a filter and recrystallized from isopropanol. The resulting ethiodide melts at about 188–189° C.

*Example 4*

A mixture of 394 parts of 2-bromoindan and 485 parts of o,p-dimethylaniline in 3000 parts of benzene is heated at reflux temperature for 12 hours, cooled and filtered. The filtrate is concentrated and the residue is taken up in ether and filtered. This filtrate is again evaporated and the final residue is distilled at about 210–220° C. and 14 mm. pressure.

To an agitated solution of 48 parts of the 2-(o,p-dimethylanilino)indan in 200 parts of ether, an ether solution of 15.7 parts of β-chloroethyl chlorocarbonate is added dropwise at 0° C. After completion of the addition the mixture is stirred for two hours at 0° C. and for 10 hours at room temperature and then filtered. The filtrate is evaporated to yield as an oily residue the β - chloroethyl N - (o,p - dimethylphenyl) - 2 - indancarbamate. This residue is heated at reflux temperature with a solution of 73.5 parts of dimethylamine, 0.5 parts of potassium iodide and 35 parts of methyl ethyl ketone for two days, concentrated under vacuum and agitated with cold dilute hydrochloric acid and ether. The aqueous layer is separated, rendered alkaline and extracted with ether. This extract is dried, filtered and evaporated to yield the β-dimethylaminoethyl N-(o,p-dimethylphenyl)-2-indancarbamate which is distilled at about 230° C., and 1.3 mm. pressure. It has the structural formula

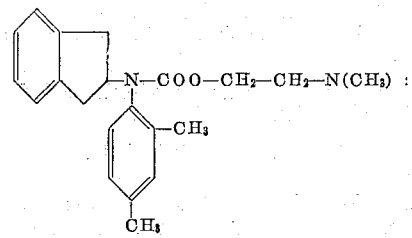

*Example 5*

A dry solution of 225 parts of 2-anilinoindan is added to an ether solution of 67 parts of phosgene by gradual addition and with stirring, the total volume of ether being 1100 parts. After standing at 0° C. for a day, the reaction mixture is filtered and the filtrate is concentrated in vacuo.

A mixture of 176 parts of the residue containing the N-phenyl-2-indancarbamyl chloride and 100 parts of β-diisopropylaminoethanol in 350 parts of toluene is refluxed for 48 hours, cooled and extracted with dilute hydrochloric acid. The aqueous solution is made alkaline and extracted with ether. This extract is dried and evaporated to yield β-diisopropylaminoethyl N-phenyl-2-indancarbamate which is distilled at about 220–230° C. and 1 mm. pressure. It has the structural formula

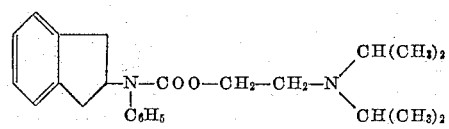

*Example 6*

A solution of 35 parts of N-phenyl-2-indancarbamyl chloride and 20 parts of ω-dimethylaminohexanol in 100 parts of toluene is refluxed for 36 hours, cooled and extracted with dilute hydrochloric acid. The extract is washed with ether, made alkaline and extracted with ether. This extract is dried, filtered and evaporated to yield ω-dimethylaminohexyl N-phenyl-2-indancarbamate which is distilled at about 225–230° C. and 1 mm. pressure. It has the structural formula

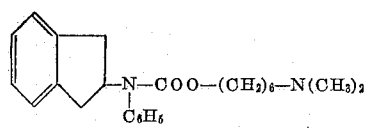

*Example 7*

55 parts of β-chloroethyl N-phenyl-1-indancarbamate are heated at reflux for 2 days with a solution of 40 parts of pyrrolidine and 2 parts of potassium iodide in 250 parts of methyl ethyl ketone. The reaction mixture is evaporated and the residue is agitated with cold dilute muriatic acid and ether. The acid layer is separated, made alkaline, extracted with ether and the ether extract is separated and dried. Evaporation of the ether gives β-pyrrolidinoethyl N-phenyl-1-indancarbamate which distills at 210–212° C. at 1 mm. pressure. It forms a crystalline hydrochloride which melts at 118–119° C. after recrystallization from ethyl acetate.

*Example 8*

10 parts of β-pyrrolidinoethyl N-phenyl-1-indancarbamate and 17 parts of methyl bromide are dissolved in 40 parts of methyl ethyl ketone and kept at 0–5° C. for 2 hours. The precipitate of the crystalline methobromide is removed, washed well with ether and dried. It melts at 171-172° C. and has the structural formula

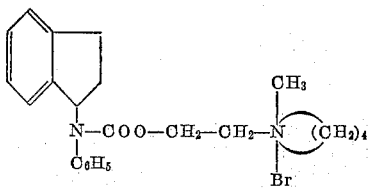

*Example 9*

A mixture of 100 parts of β-chloroethyl N-phenyl-1-indancarbamate, 60 parts of piperidine, 600 parts of methyl ethyl ketone and 4 parts of potassium iodide is heated under reflux for 48 hours, concentrated, cooled and agitated with cold dilute hydrochloric acid and ether. The aqueous layer is separated, rendered alkaline and extracted with ether. This extract is dried, filtered and evaporated to yield β-piperidinoethyl N-phenyl-1-indancarbamate as an oil which distills at about 220° C. and 1 mm. pressure. It has the structural formula

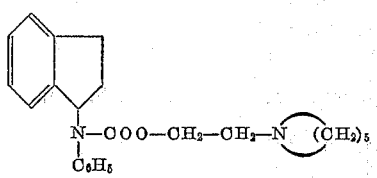

*Example 10*

A solution of 152.6 parts of 2-chloroindan and 170 parts of cyclopentylamine in 900 parts of benzene is refluxed for 10 hours, cooled and filtered. The filtrate is concentrated, chilled, treated with ether and filtered again. The resulting filtrate is vacuum distilled to yield 2-cyclopentylaminoindan.

To a stirred solution of 81 parts of this amine in 1000 parts of ether, an ether solution of 39.5 parts of γ-chloropropyl chlorocarbonate is gradually added and the resulting mixture is stirred for 2 hours, cooled, treated with benzene and filtered. The filtrate is concentrated to yield the γ-chloropropyl N-cyclopentyl-2-indancarbamate as a residue.

A mixture of 130 parts of this ester, 60 parts of ethylamine, 2 parts of potassium iodide and 160 parts of methyl ethyl ketone is heated in a shielded reactor at 80° C. for 36 hours, cooled and extracted with dilute hydrochloric acid. The extract is washed with ether, rendered alkaline and extracted with ether. This extract is dried, filtered and evaporated to yield γ-ethylaminopropyl N-cyclopentyl-2-indancarbamate which is distilled at about 200-210° C. and 2 mm. pressure. It has the structural formula

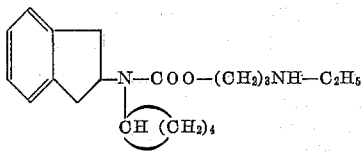

*Example 11*

152.6 parts of 1-chloroindan and 198 parts of cyclohexylamine in 1000 parts of benzene are refluxed for 15 hours. The reaction mixture is chilled and filtered. The filtrate is evaporated under vacuum and the residue is dissolved in ether and again filtered and evaporated. The final residue is distilled under vacuum. N-cyclohexyl-1-indanamine distills at about 113° C. at 0.3 mm. pressure.

87 parts of N-cyclohexyl-1-indanamine are added with agitation to a solution of 36 parts of β-chloroethyl chlorocarbonate in 1000 parts of dry ether at 5° C. The reaction mixture is diluted with benzene, allowed to stand for 15 hours, then filtered and the filtrate is evaporated, leaving a residue of β-chloroethyl N-cyclohexyl-1-indancarbamate. This is mixed with 1 part of potassium iodide and a solution of 30 parts of dimethylamine in 80 parts of methyl ethyl ketone and the resulting mixture is heated for about 2½ days at 85° C. in a closed vessel. The reaction mixture is cooled and agitated with benzene and dilute hydrochloric acid. The acidic layer is separated, made alkaline and extracted with ether. This extract is dried, filtered and evaporated to yield the β-dimethylaminoethyl N-cyclohexyl-1-indancarbamate which is distilled at about 204-207° C. at 2 mm. pressure. It forms a crystalline hydrochloride which, after recrystallization from a mixture of isopropanol and ether, melts at 161-162° C.

*Example 12*

10 parts of β-dimethylaminoethyl N-cyclohexyl-1-indancarbamate and 23 parts of methyl iodide are dissolved in 40 parts of methyl ethyl ketone. An exothermic reaction occurs upon mixing. The reaction mixture is chilled and the crystalline salt is collected on a filter, washed well with ether and dried. The crystalline methiodide thus formed melts at 208-210° C. It has the structural formula

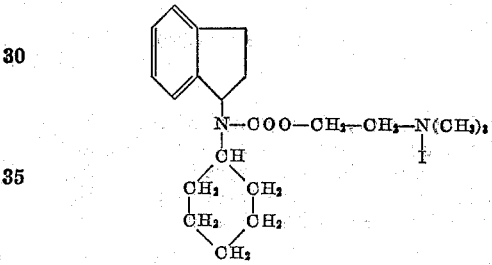

*Example 13*

A mixture of 305 parts of 2-chloroindan and 396 parts of cyclohexylamine in 2000 parts of benzene is refluxed for 12 hours, chilled and filtered. The filtrate is evaporated under vacuum and the residue is taken up in ether and again filtered and evaporated. The final residue is distilled under vacuum to yield the N-cyclohexyl-2-indanamine.

To an ice cooled, stirred solution of 72 parts of β-chloroethyl chlorocarbonate in 2000 parts of dry ether there are added gradually 175 parts of N-cyclohexyl-2-indanamine. The reaction mixture is diluted with benzene, allowed to stand for 12 hours and then filtered . The filtrate is evaporated, leaving a residue of β-chloroethyl-N-cyclohexyl-2-indancarbamate. This ester is mixed with 2 parts of potassium iodide and a solution of 98 parts of diethylamine in 150 parts of methyl ethyl ketone and the mixture is heated in a sealed vessel for about 36 hours at 85° C. After cooling, it is treated with ether and with dilute hydrochloric acid. The aqueous layer is separated, made alkaline and extracted with ether. This extract is dried, evaporated and vacuum distilled to obtain the β-diethylaminoethyl N-cyclohexyl-2-indancarbamate which distills at about 200-210° C. and 2 mm. pressure. It has the structural formula

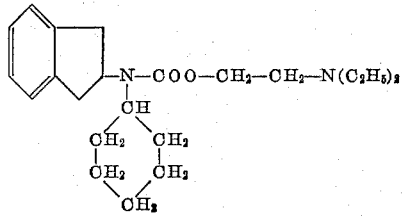

I claim:
1. A compound of the structural formula

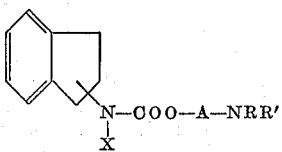

wherein X is a member of the class consisting of monocyclic aryl hydrocarbon radicals containing less than ten carbon atoms and lower cycloalkyl radicals containing five to six nuclear carbon atoms, A is a lower alkylene radical separating the oxygen and nitrogen atoms attached thereto by at least two carbon atoms, and NRR' is a member of the class consisting of lower alkylamino radicals, lower dialkylamino radicals and radicals wherein R and R' are combined to form an alkylene chain containing more than three and less than six carbon atoms in the heterocyclic nucleus formed thereby.

2. A compound of the structural formula

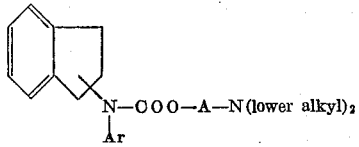

wherein Ar is a monocyclic aryl hydrocarbon radical containing less than ten carbon atoms, and A is a lower alkylene radical separating the oxygen and nitrogen atoms attached thereto by at least two carbon atoms.

3. A compound of the structural formula

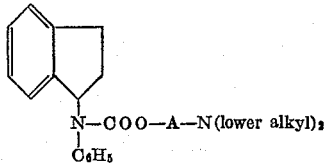

wherein A is a lower alkylene radical separating the oxygen and nitrogen atoms attached thereto by at least two carbon atoms.

4. α-Diethylaminoethyl N-phenyl-1-indancarbamate.

5. A compound of the structural formula

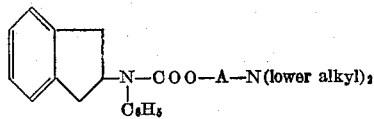

wherein A is a lower alkylene radical separating the oxygen and nitrogen atoms attached thereto by at least two carbon atoms.

6. A compound of the structural formula

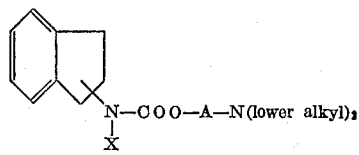

wherein X is a lower cycloalkyl radical containing five to six nuclear carbon atoms and A is a lower alkylene radical separating the oxygen and nitrogen atoms attached thereto by at least two carbon atoms.

7. A compound of the structural formula

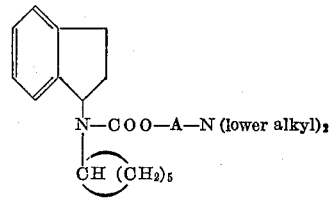

wherein A is a lower alkylene radical separating the oxygen and nitrogen atoms attached thereto by at least two carbon atoms.

8. β-Dimethylaminoethyl N-cyclohexyl-1-indancarbamate.

9. A compound of the structural formula

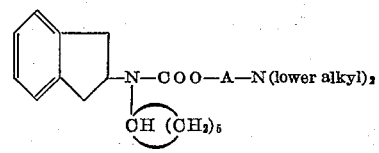

wherein A is a lower alkylene radical separating the oxygen and nitrogen atoms attached thereto by at least two carbon atoms.

10. A compound of the structural formula

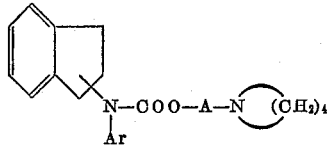

wherein Ar is a monocyclic aryl hydrocarbon radical containing less than ten carbon atoms and A is a lower alkylene radical separating the oxygen and nitrogen atoms attached thereto by at least two carbon atoms.

11. β-Pyrrolidinoethyl N-phenyl-1-indancarbamate.

References Cited in the file of this patent

UNITED STATES PATENTS

| | | |
|---|---|---|
| 2,104,753 | Major et al. | Jan. 11, 1938 |
| 2,556,146 | Olsen | June 5, 1951 |
| 2,623,046 | Cusic | Dec. 23, 1952 |
| 2,662,092 | Cusic | Dec. 8, 1953 |

OTHER REFERENCES

Cheney et al.: J. A. C. S., vol. 64, pp. 970–3 (1942).